United States Patent
Ikemura et al.

(10) Patent No.: US 12,237,694 B2
(45) Date of Patent: Feb. 25, 2025

(54) POWER RECEPTION DEVICE AND NON-CONTACT POWER TRANSMISSION SYSTEM

(71) Applicant: TOYOTA JIDOSHA KABUSHIKI KAISHA, Toyota (JP)

(72) Inventors: Ryosuke Ikemura, Susono (JP); Shogo Tsuge, Fuji (JP); Masato Maemura, Nisshin (JP); Toshiya Hashimoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 6 days.

(21) Appl. No.: 18/471,387

(22) Filed: Sep. 21, 2023

(65) Prior Publication Data
US 2024/0106275 A1    Mar. 28, 2024

(30) Foreign Application Priority Data
Sep. 26, 2022   (JP) .................. 2022-152730

(51) Int. Cl.
*H02J 50/12*   (2016.01)
(52) U.S. Cl.
CPC .................... *H02J 50/12* (2016.02)

(58) Field of Classification Search
None
See application file for complete search history.

(56) References Cited

U.S. PATENT DOCUMENTS

| 2017/0033615 A1* | 2/2017 | Asanuma ................ H02J 50/12 |
| 2018/0090995 A1* | 3/2018 | Arasaki .................. H02H 9/041 |
| 2019/0165611 A1* | 5/2019 | Miyazawa .............. H02M 7/06 |

FOREIGN PATENT DOCUMENTS

JP        6361818 B2    7/2018

\* cited by examiner

*Primary Examiner* — Carlos Amaya
*Assistant Examiner* — Aqeel H Bukhari
(74) *Attorney, Agent, or Firm* — Oliff PLC

(57) ABSTRACT

A power reception device includes: a power reception coil that receives power transmitted from a power transmission coil in a non-contact manner; and a control device that executes a short-circuit mode in which a plurality of switching elements provided between the power reception coil and a load are caused to perform switching operations to short-circuit between output terminals of the power reception coil. Further, when a phase of a current and a phase of a voltage in the power reception device are deviated from each other, the control device sets switching timings of the switching elements to the short-circuit mode in a manner that the phase of the voltage is shifted in a direction in which a power factor of power supplied to the load is deteriorated.

4 Claims, 13 Drawing Sheets

POWER RECEPTION DEVICE AND NON-CONTACT POWER TRANSMISSION SYSTEM

CROSS-REFERENCE TO RELATED APPLICATION(S)

The present application claims priority to and incorporates by reference the entire contents of Japanese Patent Application No. 2022-152730 filed in Japan on Sep. 26, 2022.

BACKGROUND

The present disclosure relates to a power reception device and a non-contact power transmission system.

Japanese Patent No. 6361818 discloses that a switching element for power control is provided in a power reception device of a non-contact power transmission system, and when a voltage on the power reception device side exceeds a reference value, an operation of the switching element is controlled to form a short circuit, thereby interrupting charging and avoiding an excessive voltage rise.

SUMMARY

There is a need for providing a power reception device and a non-contact power transmission system capable of suppressing an increase in power when a short circuit is formed by operation of a switching element.

According to an embodiment, a power reception device includes: a power reception coil that receives power transmitted from a power transmission coil in a non-contact manner; and a control device that executes a short-circuit mode in which a plurality of switching elements provided between the power reception coil and a load are caused to perform switching operations to short-circuit between output terminals of the power reception coil. Further, when a phase of a current and a phase of a voltage in the power reception device are deviated from each other, the control device sets switching timings of the switching elements to the short-circuit mode in a manner that the phase of the voltage is shifted in a direction in which a power factor of power supplied to the load is deteriorated.

DETAILED DESCRIPTION

In the related art, according to findings of the present inventors, it has been found that when power suppression control for forming a short-circuit is performed by a switching element, a phenomenon (overshoot) occurs in which power surges and exceeds the target value. Exceeding the rating due to overshoot may cause deterioration or failure of the battery. In this case, it is conceivable to provide a safety margin between the rated value and the target value of the power control on the assumption that the overshoot occurs, but this leads to a decrease in the received power during non-contact charging.

Hereinafter, a power reception device and a non-contact power transmission system in embodiments of the present disclosure will be specifically described with reference to the drawings. Note that the present disclosure is not limited to the embodiments described below.

Figure 1:
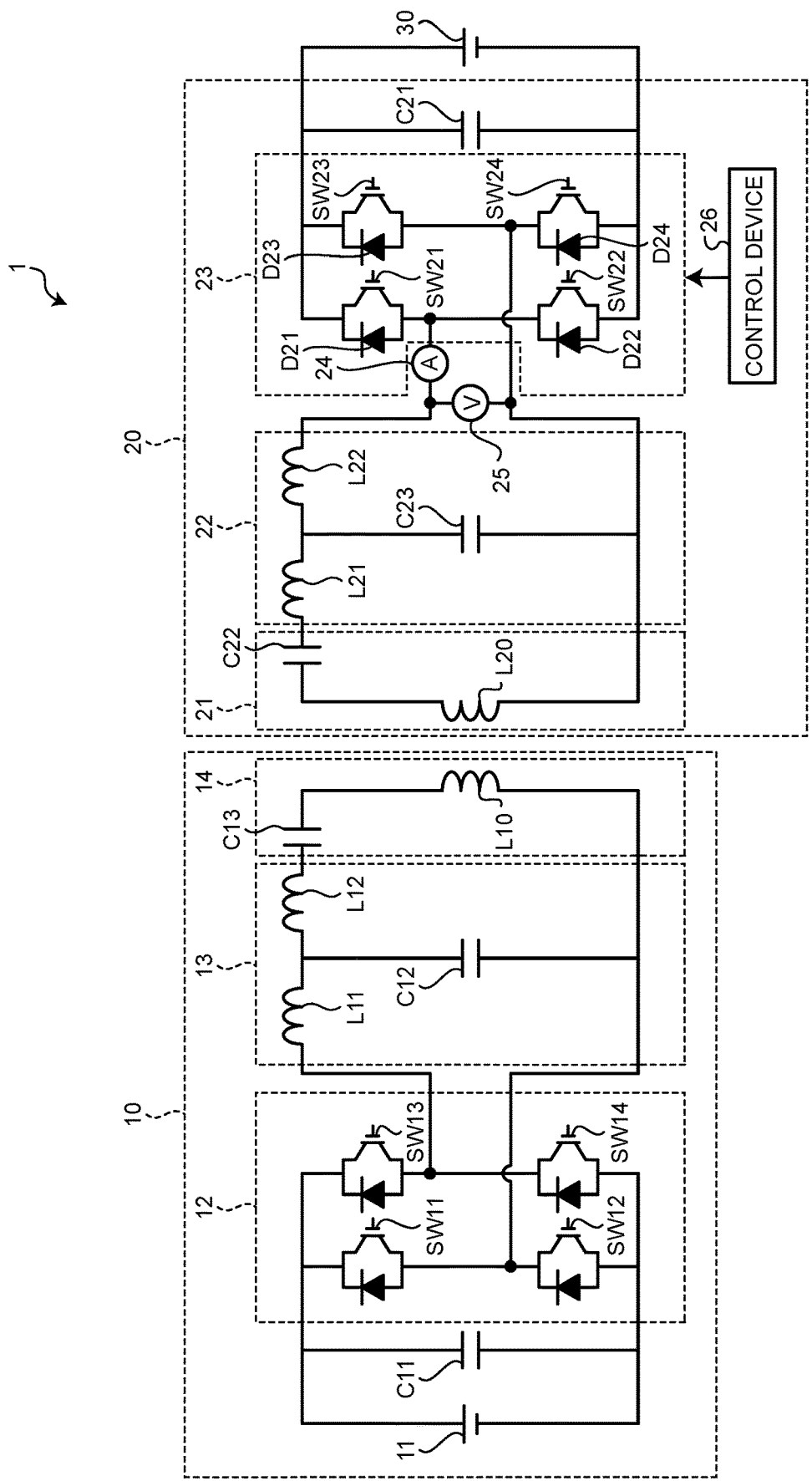
FIG. 1 is a diagram schematically illustrating a non-contact power transmission system according to an embodiment.

FIG. 1 is a diagram schematically illustrating a non-contact power transmission system according to an embodiment. A non-contact power transmission system 1 includes a power transmission device 10 and a power reception device 20. The non-contact power transmission system 1 is a wireless power transmission system, and transmits power from a power transmission coil L10 of the power transmission device 10 to a power reception coil L20 of the power reception device 20 in a non-contact manner. A battery 30 which is a load on the power reception side is electrically connected to the power reception device 20.

The power transmission device 10 includes a DC power supply 11, a smoothing capacitor C11, an inverter 12, a filter circuit 13, and a power transmission-side resonant circuit 14.

The DC power supply 11 supplies DC power to the inverter 12. The smoothing capacitor C11 is provided between the DC power supply 11 and the inverter 12. The smoothing capacitor C11 is connected in parallel with the inverter 12.

The inverter 12 is a power conversion device that converts the DC power supplied from the DC power supply 11 into AC power. The inverter 12 is configured as a full-bridge circuit in which four switching elements SW11, SW12, SW13, and SW14 are full-bridge connected. A diode is connected in parallel to each of the switching elements SW11 to SW14. Each of the switching elements SW11 to SW14 is constituted by an IGBT, and performs a switching operation according to a control signal. The inverter 12 supplies the converted AC power to the filter circuit 13.

The filter circuit 13 removes noise included in AC current input from the inverter 12, and outputs AC power from which the noise has been removed to the power transmission-side resonant circuit 14. The filter circuit 13 is a T-type filter in which a coil L11, a capacitor C12, and a coil L12 are arranged in a T-shape.

The power transmission-side resonant circuit 14 includes the power transmission coil L10 and a resonant capacitor C13. The power transmission coil L10 transmits the AC power supplied from the filter circuit 13 to the power reception device 20 in a non-contact manner. The power transmission coil L10 forms an LC resonance circuit together with the resonant capacitor C13. The resonant capacitor C13 is connected in series to one end of the power transmission coil L10, and adjusts a resonance frequency of the LC resonance circuit.

The power reception device 20 includes a power reception-side resonant circuit 21, a filter circuit 22, a rectifier 23, a smoothing capacitor C21, a current sensor 24, a voltage sensor 25, and a control device 26. The power reception device 20 receives power from the power transmission device 10 in a non-contact manner.

The power reception-side resonant circuit 21 includes the power reception coil L20 and a resonant capacitor C22. The power reception coil L20 receives the power transmitted from the power transmission coil L10 in a non-contact manner. The power reception coil L20 forms an LC resonance circuit together with the resonant capacitor C22. The resonant capacitor C22 adjusts the resonance frequency of the LC resonance circuit.

The filter circuit 22 removes noise included in AC current input from the power reception-side resonant circuit 21, and outputs AC power from which the noise has been removed to the rectifier 23. The filter circuit 22 is a T-type filter in which a coil L21, a capacitor C23, and a coil L22 are arranged in a T-shape.

The rectifier 23 is a rectifier circuit that converts AC power input from the filter circuit 22 into DC power and outputs the DC power to the battery 30. The rectifier 23 is configured as a full-bridge circuit in which four diodes D21, D22, D23, and D24 are full-bridge connected as rectifier elements. One end of the filter circuit 22 is connected to a connection point between an anode of the diode D21 and a cathode of the diode D22. The other end of the filter circuit 22 is connected to a connection point between an anode of the diode D23 and a cathode of the diode D24.

A switching element is connected in parallel to each of the diodes D21, D22, D23, and D24. A switching element SW21 is connected in parallel to the diode D21. A switching element SW22 is connected in parallel to the diode D22. A switching element SW23 is connected in parallel to the diode D23. A switching element SW24 is connected in parallel to the diode D24. Each of the switching elements SW21 to SW24 is constituted by an IGBT, and performs a switching operation according to a control signal from the control device 26.

The rectifier 23 supplies the converted DC power to the battery 30. The smoothing capacitor C21 is provided between the rectifier 23 and the battery 30. The smoothing capacitor C21 is connected in parallel with the rectifier 23.

The current sensor 24 detects an input current of the rectifier 23. The current sensor 24 is provided between the filter circuit 22 and the rectifier 23. The current sensor 24 detects a current flowing through the rectifier 23 and outputs a detection signal thereof to the control device 26.

The voltage sensor 25 detects an input voltage of the rectifier 23. The voltage sensor 25 is provided between the filter circuit 22 and the rectifier 23, and is connected in parallel with the rectifier 23. The voltage sensor 25 detects a voltage input to the rectifier 23 and outputs a detection signal thereof to the control device 26.

The control device 26 is an electronic control device that controls the rectifier 23. Signals from various sensors provided in the power reception device 20 are input to the control device 26. Then, the control device 26 executes various controls on the basis of signals input from various sensors.

For example, the control device 26 executes power control for controlling power supplied to the battery 30 during non-contact charging. For the purpose of protecting the load on the power reception side, the non-contact power transmission system 1 is configured to form a short-circuit path using the switching elements SW21 to SW24 of the power reception device 20 during non-contact charging to suppress the amount of power supplied to the load. Thus, the control device 26 executes power control during non-contact charging and controls each of the switching elements SW21 to SW24 of the rectifier 23.

The power control includes a diode mode and a short-circuit mode. The control device 26 can switch between the diode mode and the short-circuit mode.

Figure 2:
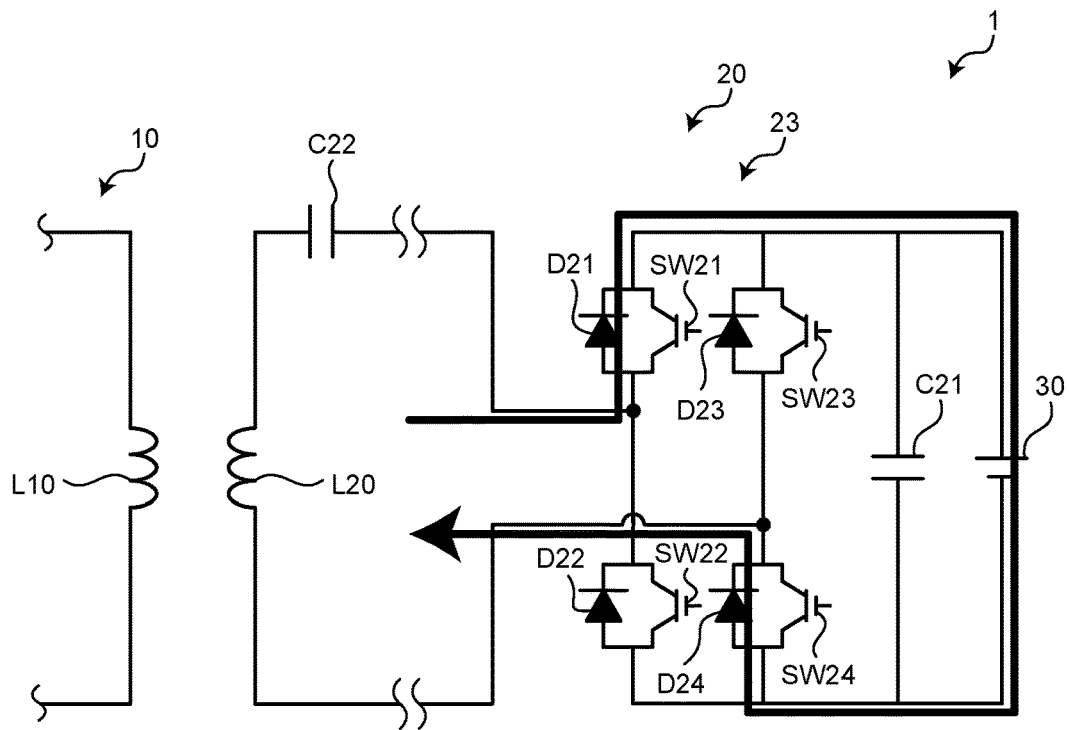
FIG. 2 is a diagram for describing a current path in a diode mode.

The diode mode is control in which a current flows through the battery 30 and received power is supplied from the power reception device 20 to the battery 30. In the diode mode, all the switching elements SW21, SW22, SW23, and SW24 of the rectifier 23 are controlled to an off state. The path of the current in the diode mode is a path for feedback via the diode D21, the battery 30, and the diode D24 as indicated by an arrow in FIG. 2. Note that, in FIG. 2, the current sensor 24 and the voltage sensor 25 are omitted. In addition, the current of the battery 30 may be referred to as a battery current.

The short-circuit mode is a control in which a current flows back and no current flows into the battery 30. That is, the short-circuit mode is a mode in which the current is circulated from the rectifier 23 to the power reception coil L20 side. In the short-circuit mode, the switching elements SW21, SW22, and SW24 of the rectifier 23 are controlled to an off state, and the switching element SW23 is controlled to an on state. As indicated by an arrow in FIG. 3, a path of the current in the short-circuit mode is a path for feedback via the diode D21 and the switching element SW23. Note that, in FIG. 3, the current sensor 24 and the voltage sensor 25 are omitted.

Figure 3:
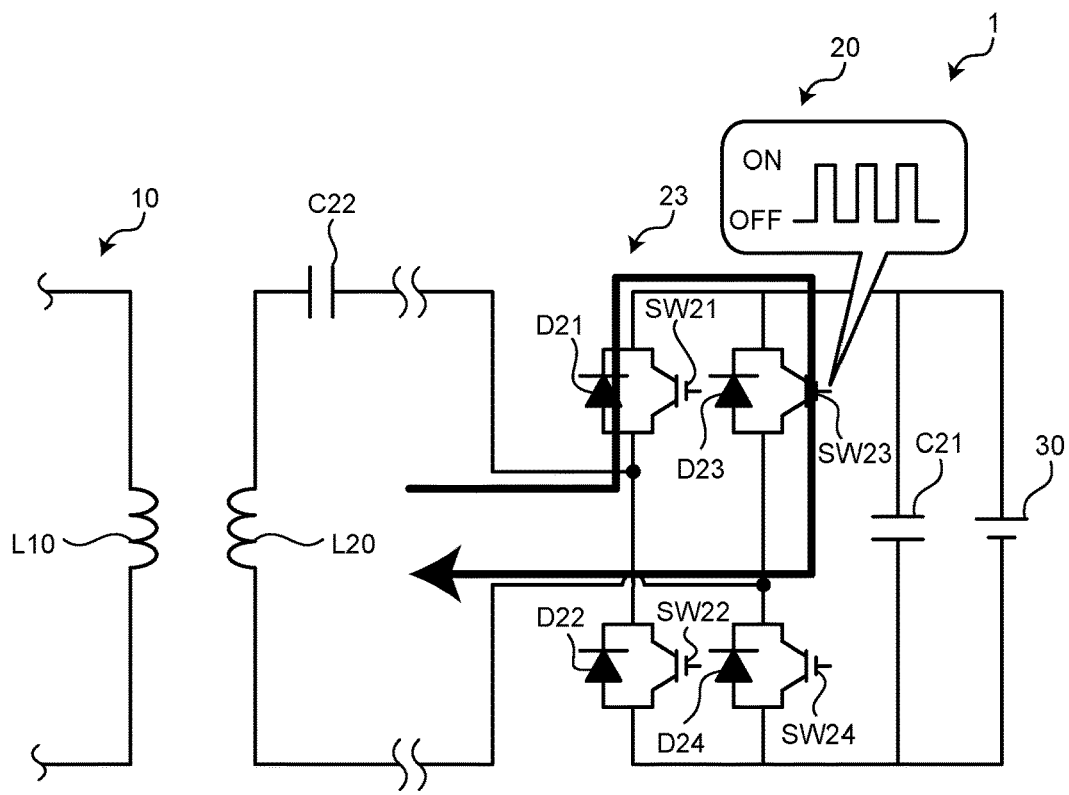
FIG. 3 is a diagram for describing a current path in a short-circuit mode.

By the control device 26 executing the short-circuit mode, the amount of power supplied to the battery 30 can be reduced. The control device 26 executes control for switching between the diode mode and the short-circuit mode when reducing the received power of the battery 30. As illustrated in FIG. 3, the control device 26 executes switching control for switching the switching element SW23 between an off state and an on state.

Figure 4:
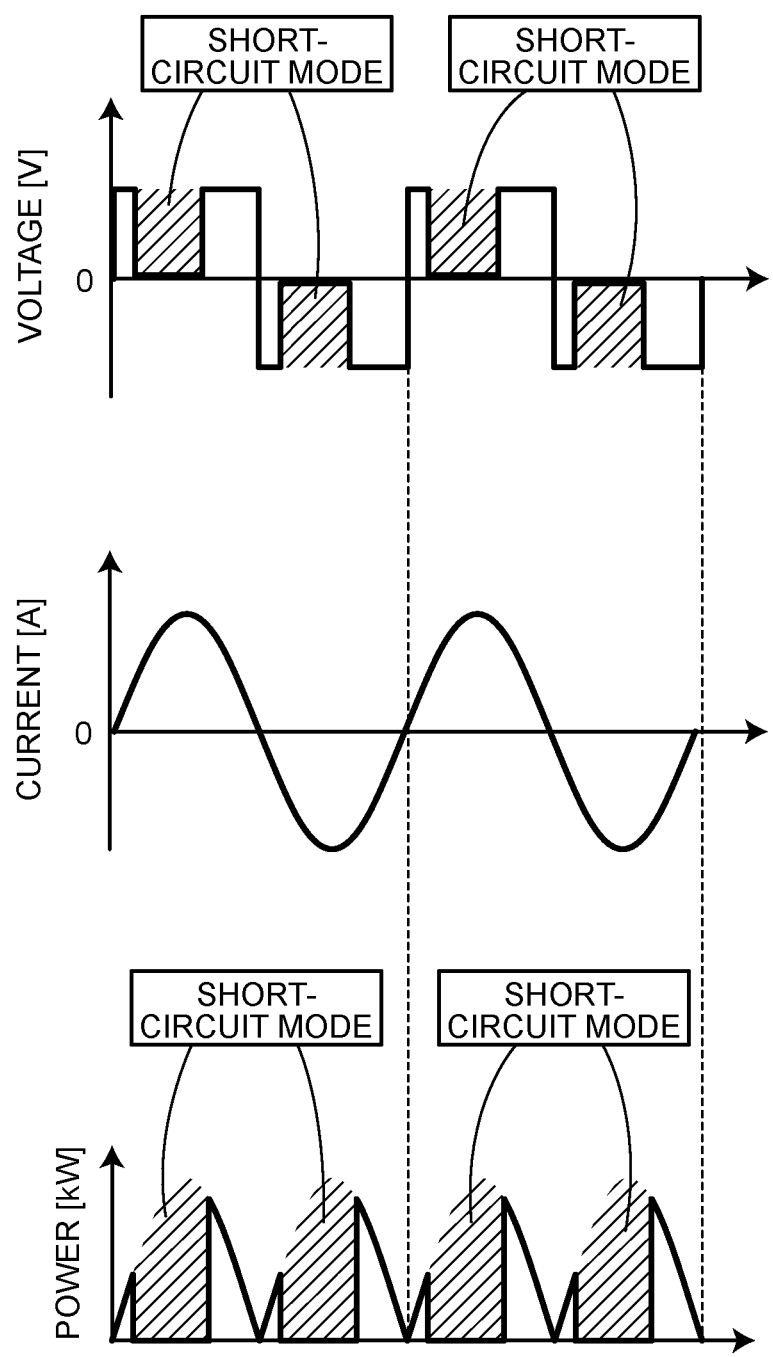
FIG. 4 is a diagram illustrating a voltage and a current on an input side of a rectifier and received power supplied to a battery when the short-circuit mode is executed.

Further, during the short-circuit mode, as illustrated in FIG. 4, the current waveform on the input side of the rectifier 23 does not greatly change, and the voltage becomes zero.

That is, the current waveform in the rectifier 23 does not greatly change between the diode mode and the short-circuit mode. Then, during the short-circuit mode, since the output voltage of the rectifier 23 becomes zero, the received power of the battery 30 becomes zero.

Figure 5:
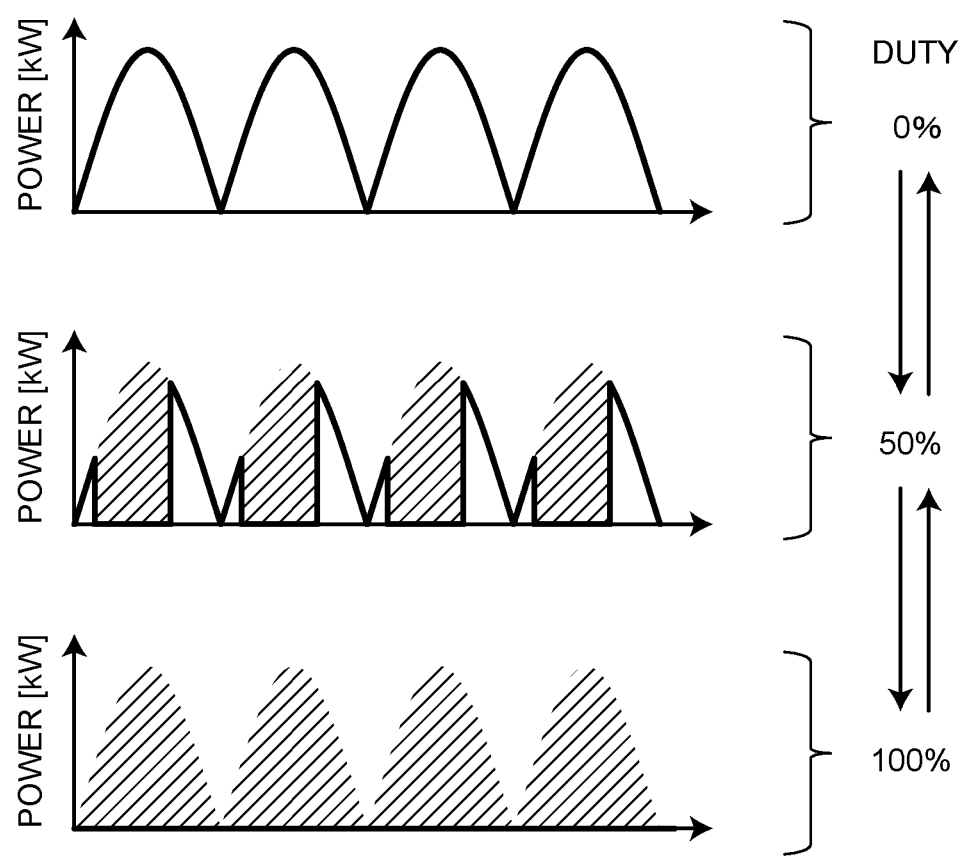
FIG. 5 is a diagram illustrating a relationship between a duty in the short-circuit mode and the received power.

Further, the control device 26 controls the duty, which is a ratio that the short-circuit mode occupies in the voltage rectangular wave, to 0 to 100%. As illustrated in FIG. 5, the control device 26 controls the received power of the battery 30 between 0% and 100% by operating the duty in the short-circuit mode.

In the non-contact power transmission system 1 configured as described above, the control device 26 performs the power control during non-contact charging, so that the power increase of the battery 30 can be suppressed to protect the battery 30.

For example, when the power transmission device 10 is a ground-side unit installed on the ground and the power reception device 20 is a vehicle-side unit mounted on a vehicle, the non-contact power transmission system 1 is a system configured to be able to wirelessly supply power to a traveling vehicle. Since this vehicle is a battery electric vehicle equipped with the battery 30, regenerative charging of the battery 30 can be performed by performing regeneration during traveling. Thus, when regeneration and non-contact charging are simultaneously performed during traveling, excessive power is supplied to the battery 30, which may cause deterioration or failure of the battery 30. In order to prevent this, the control device 26 executes power control to reduce the received power by non-contact charging. That is, the control device 26 performs control so as to prioritize regeneration and to refrain from non-contact charging.

However, as a result of a wireless power feeding test using an actual vehicle performed by the present inventors, it has been found that an overshoot occurs in which the received power of the battery 30 exceeds a target value nearly twice when the power control using the switching element on the power reception device 20 side is attempted.

Figure 6:
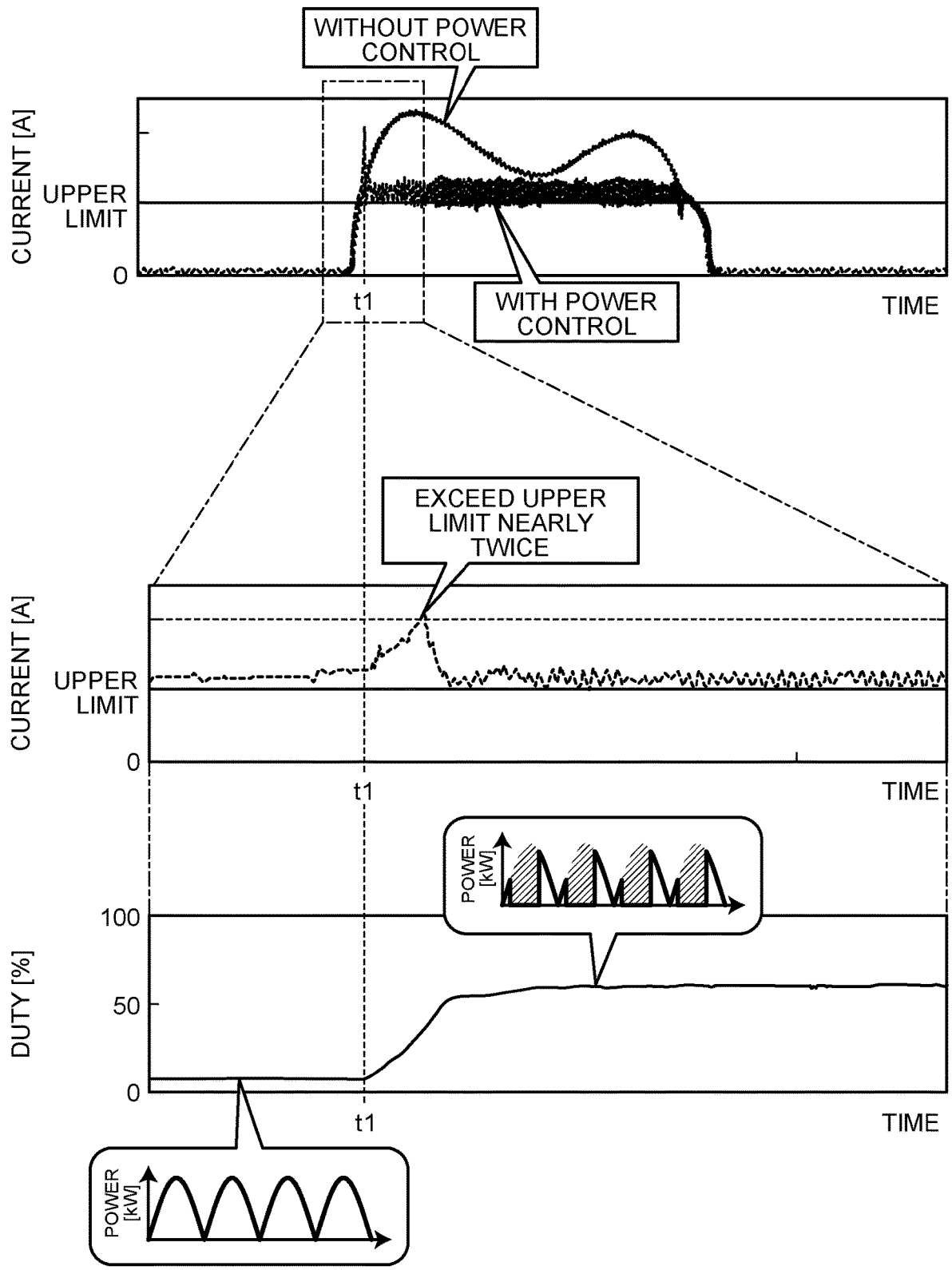
FIG. 6 is a diagram illustrating a result of a wireless power feeding test using an actual vehicle.

FIG. 6 is a diagram illustrating a result of the wireless power feeding test using an actual vehicle. Note that, FIG. 6 illustrates a test result of power feeding during traveling when the vehicle on which the power reception coil L20 is mounted passes over the power transmission coil L10. Further, the upper part of FIG. 6 illustrates a change in the battery current according to the presence or absence of the power control. The middle part of FIG. 6 illustrates a change in the battery current when the power control is executed, with a part of the upper part of FIG. 6 being enlarged. The lower part of FIG. 6 illustrates a change in the duty corresponding to the middle part of FIG. 6.

As illustrated in the upper part of FIG. 6, when the power control is not executed during non-contact charging, the current (battery current) of the battery 30 exceeds the upper limit and naturally increases, so that the received power of the battery 30 naturally increases. When the power control is executed during non-contact charging in order to avoid this, the control device 26 starts the power control when the battery current reaches the upper limit during non-contact charging (time t1).

However, immediately after time t1, the control device 26 started the power control, and at the moment when the duty which is the operation amount of the rectifier 23 started to be increased, the battery current started to increase rapidly, and the received power started to increase. At that time, the battery current exceeded the upper limit nearly twice. Specifically, while the duty increases from 0% to near 50%, in particular, in the vicinity of 10% to 20%, the battery current continues to surge and reaches a value close to twice the upper limit, and when the increase in the duty is settled, the battery current decreases to a value close to the upper limit. During this period, the received power increased with an increase in the battery current. In this phenomenon, even if the power increase momentum is compared with the power waveform when the vehicle passes over the power transmission coil L10 in a state where the power control is not executed, the waveform is peculiar. From this, it is conceivable that the execution of the short-circuit mode using the rectifier 23 causes an increase in power contrary to the original purpose (power reduction).

Accordingly, the present inventors have studied a mechanism in which formation of a short circuit by the rectifier 23 causes an increase in received power.

Figure 7:
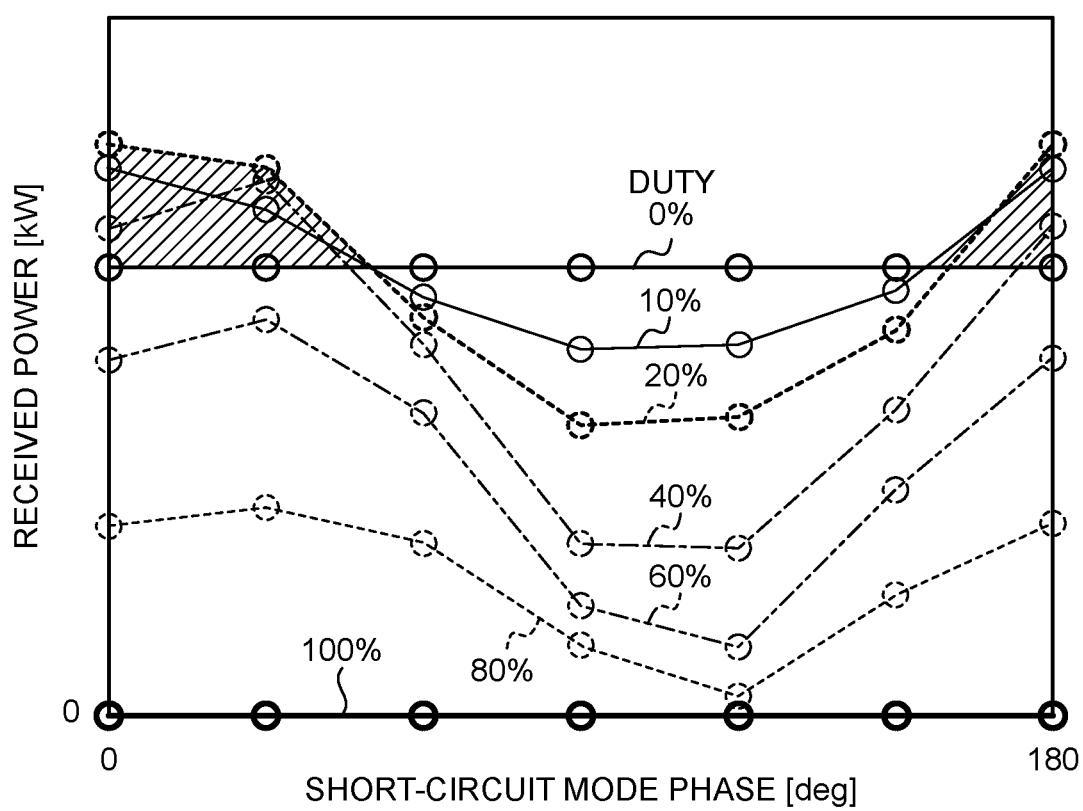
FIG. 7 is a diagram illustrating a relationship between the received power of the battery, a phase of the short-circuit mode, and the duty.

First, the present inventors have focused on a phenomenon in which the received power increases when the duty of the short-circuit mode increases, and examined the relationship between the magnitude of the duty and the received power. As a result, as illustrated in FIG. 7, it has been found that there is a combination of the duty and the phase that causes the power increase as compared with the received power in a case where the duty is 0% although the duty is larger than 0%.

For example, when the duty is 60% or more, that is, when the duty is large to some extent, the received power decreases in any phase. On the other hand, when the duty is equal to or less than 40%, that is, when the duty is small, the received power increases in a specific phase. In particular, it has been found that the power increase is particularly large when the duty is 10 to 20%. In addition, the phase in which the power increase occurs includes a range of 0 to 40 degrees and 160 to 180 degrees.

That is, as a first factor, there is a condition that the received power becomes larger in a case where the duty is small than in a case where the duty is 0% in a specific phase. When the duty is controlled to 50% by the power control, the duty gradually increases from 0% as illustrated in FIG. 6. In the process, the duty passes through a range of 40% or less that causes an increase in the received power as illustrated in FIG. 7. In this range, as illustrated in FIG. 7, there is a condition that the power becomes larger than the received power when the duty is 0% depending on a phase (switching timing) in which the short-circuit mode is executed. Thus, if the phase of the short-circuit mode is set to 0 to 40 degrees or 160 to 180 degrees when the duty passes through the range, the received power is increased by the power control.

Furthermore, the present inventors have continued to study the mechanism in which formation of the short circuit by the rectifier 23 causes an increase in the received power. As a result, the following second to fifth factors can be mentioned.

Second factors include variations in characteristics due to the capacitance of the capacitor, the number of windings of the coil, and the like, and interaction between ferrite cores of the power transmission coil L10 and the power reception coil L20. Due to the variations in characteristics and the interaction between the ferrite cores, a circuit constant such as inductance deviates from the design value, and the resonance frequency of the circuit shifts from the drive frequency of the inverter 12. For example, when the driving frequency of the inverter 12 is fixed to 85 kHz, the resonance frequency of the power transmission-side resonant circuit 14 deviates to 84 kHz or 83 kHz, and the resonance frequency of the power reception-side resonant circuit 21 deviates to 84 kHz or 83 kHz.

Figure 8:
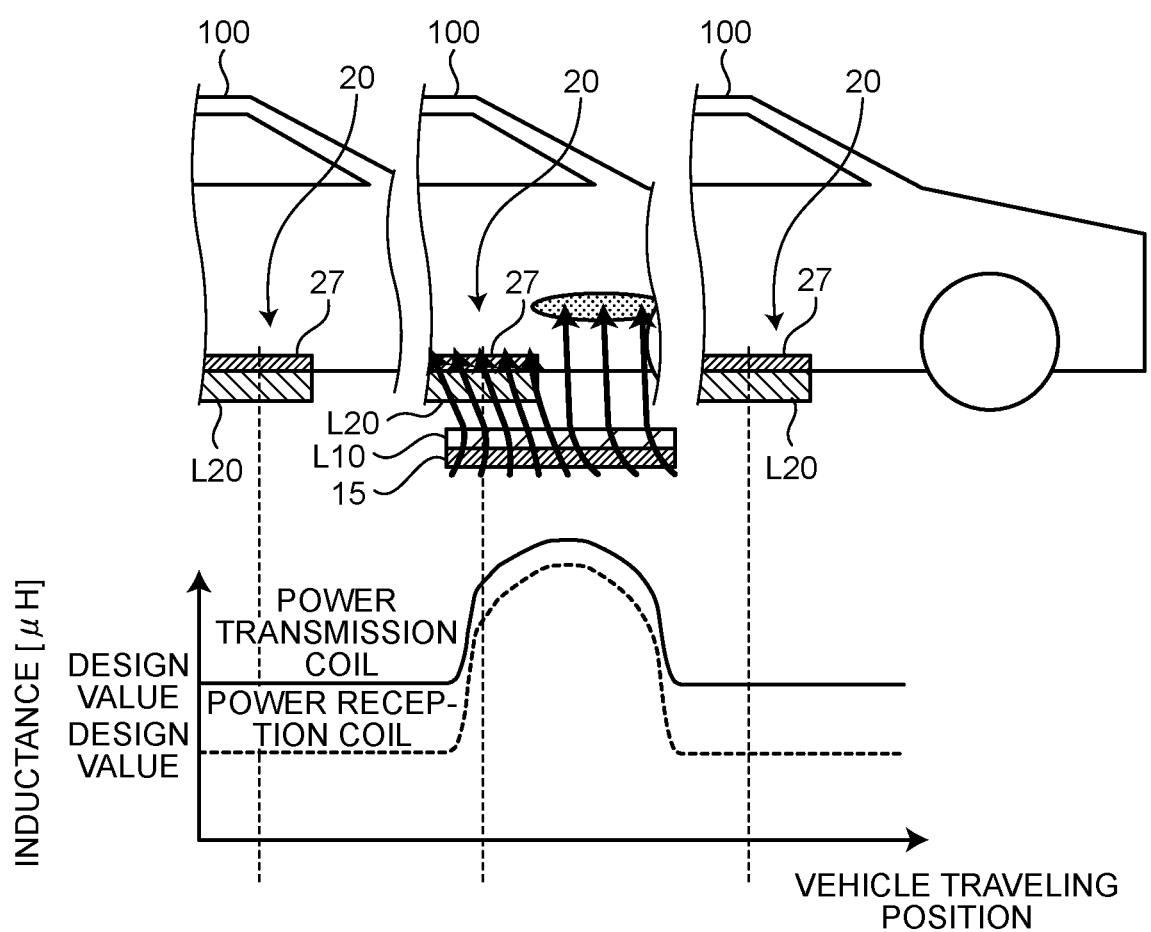
FIG. 8 is a diagram for describing a change in inductance according to a positional relationship between a power transmission coil and a power reception coil.

As illustrated in FIG. 8, when the power reception device 20 mounted on the vehicle 100 passes over the power transmission coil L10 installed on the ground, the inductance deviates from the design value due to the interaction between the ferrite cores in the process of changing the positional relationship between a ferrite core 15 of the power transmission coil L10 and a ferrite core 27 of the power reception coil L20.

As a third factor, the deviation of the circuit constant from the design value due to the second factor collapses the current waveform flowing through the circuit, so that a phase deviation occurs between the fundamental wave component of the current and the fundamental wave component of the voltage, and the power factor of the received power decreases. The power factor of the received power is represented by a cosine of the phase deviation. The equation of the received power is expressed by "$P=I*V*\cos \Delta\theta$", wherein $\Delta\theta$ represents a phase deviation (phase difference) and $\cos \Delta\theta$ represents the power factor.

Figure 9:
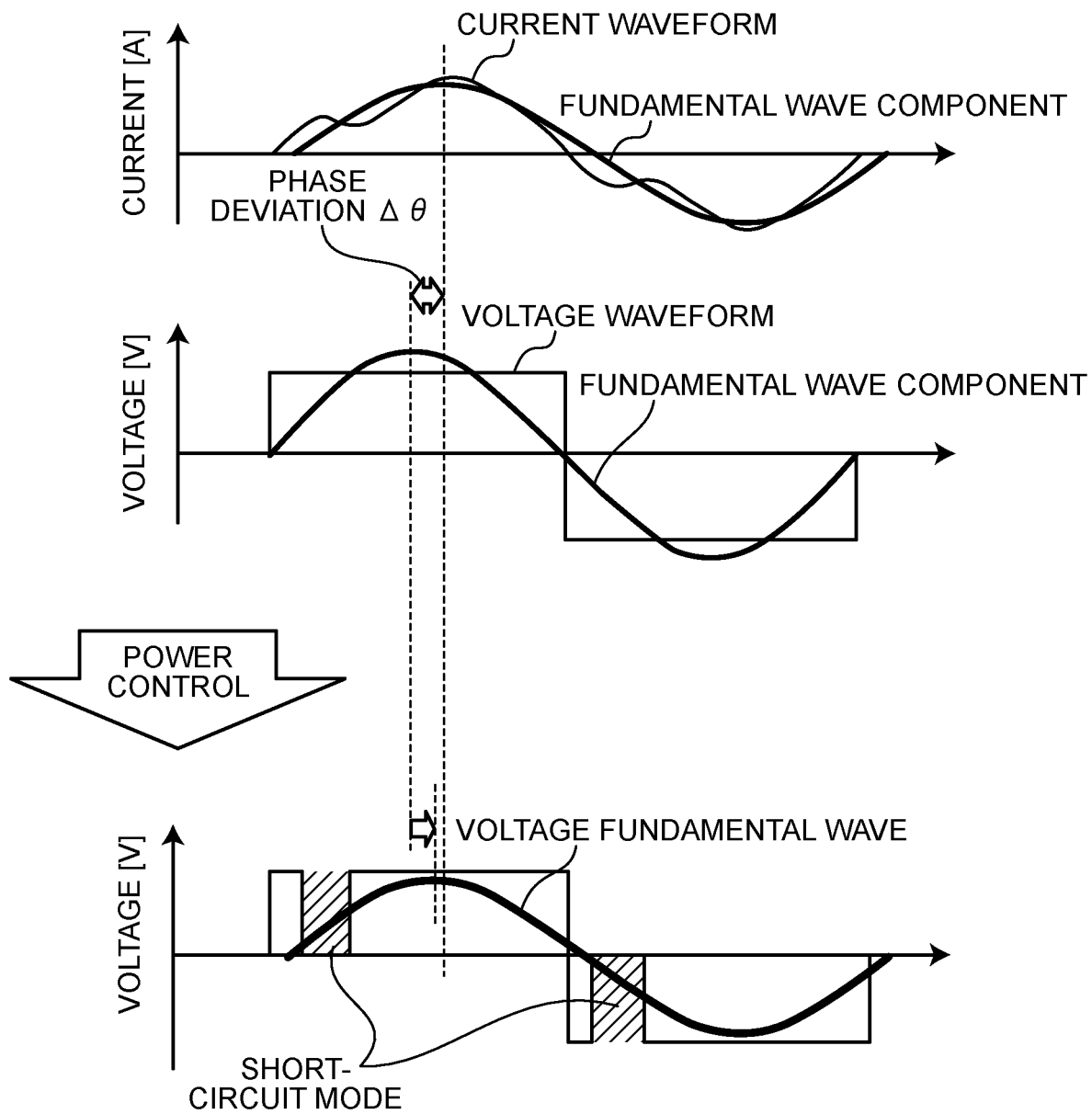
FIG. 9 is a diagram illustrating an example of a case where power control is executed in a state where a phase of a current lags behind a phase of a voltage.

As illustrated in FIG. 8, when the circuit constant shifts from the design value and the current waveform collapses, for example, as illustrated in FIG. 9, a phase deviation $\Delta\theta$ occurs so that the fundamental wave component (current fundamental wave) of the current lags behind the phase of the fundamental wave component (voltage fundamental wave) of the voltage. The power factor of the received power decreases according to the phase deviation $\Delta\theta$. When the power factor decreases, the received power decreases.

A fourth factor is that, when the power control is executed to form the short circuit in the rectifier 23, a period in which the voltage rectangular wave becomes zero occurs, but the voltage fundamental wave is thereby pushed out to the left and right (phase shift). This shifted phase includes a direction in which the power factor is deteriorated and a direction in which the power factor is improved.

As illustrated in FIG. 9, when the power control is executed in a state in which the phase of the current lags behind the phase of the voltage, in a case where the voltage fundamental wave is pushed to the right side by the phase of the short-circuit mode, the voltage fundamental wave is phase-shifted in a direction in which the phase deviation $\Delta\theta$ with respect to the current fundamental wave is eliminated, and the power factor that has decreased due to the third factor is improved.

Further, as illustrated in FIG. 9, the voltage waveform (voltage rectangular wave) is a waveform including two peaks (peak of positive voltage and peak of negative voltage) in one cycle. In this description, the left side of one peak of the voltage rectangular wave is referred to as a phase advance side, and the right side is referred to as a phase delay side. When described as the right side of the voltage rectangular wave, the expression refers to both the right side of the peak of the positive voltage and the right side of the peak of the negative voltage. When described as the left side of the voltage rectangular wave, the expression refers to both the left side of the peak of the positive voltage and the left side of the peak of the negative voltage.

Figure 10:
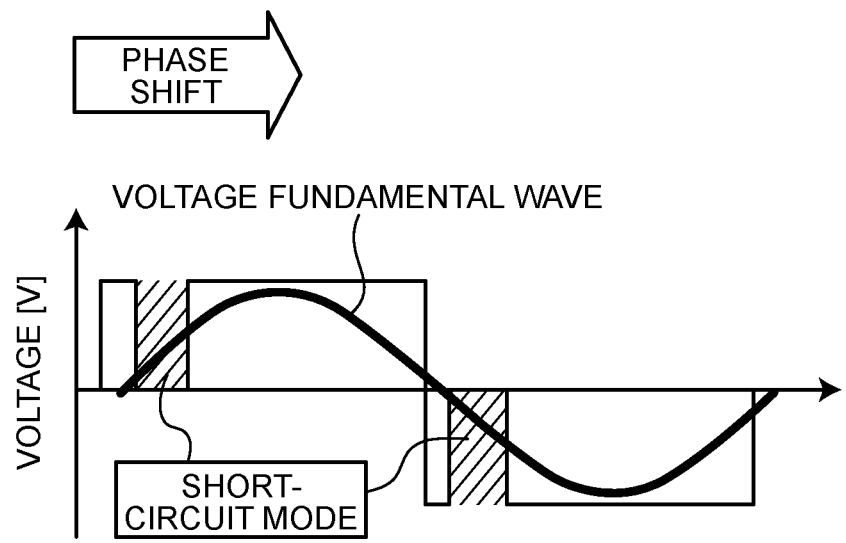
FIG. 10 is a diagram for describing a phase shift of a voltage fundamental wave that occurs when the short-circuit mode is executed in a short-circuit phase in which a left side of a voltage rectangular wave is cut off as power control.
Figure 11:
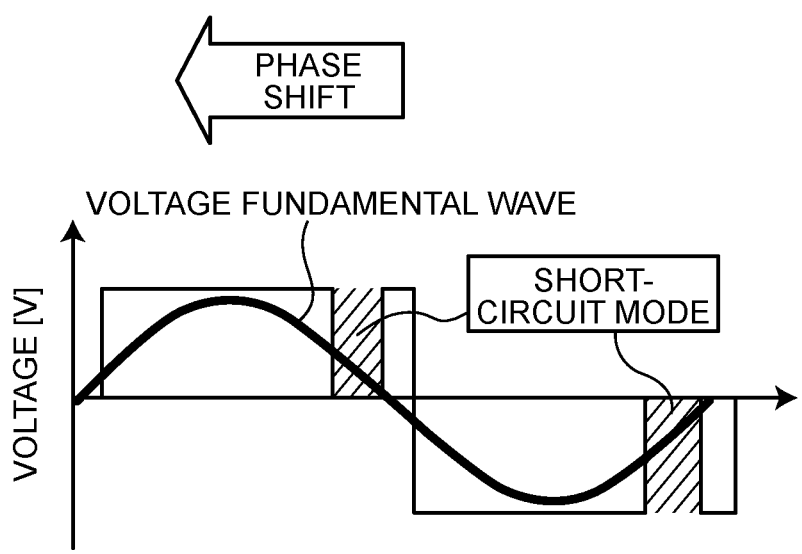
FIG. 11 is a diagram for describing a phase shift of the voltage fundamental wave that occurs when the short-circuit mode is executed in the short-circuit phase in which a right side of the voltage rectangular wave is cut off as power control.

For example, as illustrated in FIG. 10, when the phase of the short-circuit mode is set so as to cut off the left side of the voltage rectangular wave and the power control is executed, a phase shift occurs in which the voltage fundamental wave is pushed out to the right side. As illustrated in FIG. 11, when the phase of the short-circuit mode is set so as to cut off the right side of the voltage rectangular wave and the power control is executed, a phase shift occurs in which the voltage fundamental wave is pushed out to the left side.

Furthermore, when the power control is executed, the amplitude of the voltage fundamental wave decreases as the period (duty) during which the voltage rectangular wave becomes zero increases. As illustrated in FIG. 9, the amplitude of the voltage fundamental wave during the execution of the power control (when the duty is larger than 0%) is smaller than the amplitude of the voltage fundamental wave before the execution of the power control (when the duty is 0%).

A fifth factor is that the received power is increased by formation of the short circuit by the rectifier 23 when the power factor improving effect by the fourth factor satisfies the dominant condition. The received power during execution of the power control is decided by multiplying the amplitude decrease of the voltage fundamental wave by a power factor improving effect or a power factor deteriorating effect by the phase shift. When the power control is started, the duty is increased so that the received power falls within the target value, but in the process of the increase, when the power factor improving effect becomes dominant over the decrease in amplitude of the voltage fundamental wave, the power unintentionally increases.

In particular, when the fifth factor and the first factor overlap, a surge in the battery current, that is, a surge in the power supplied to the battery 30 as illustrated in FIG. 6 may occur. As a countermeasure against this, the non-contact power transmission system 1 is configured to suppress an increase in power due to the fifth factor, thereby suppressing an increase in power due to the formation of the short-circuit path.

Accordingly, the control device 26 controls the switching timing (short-circuit phase) at which the short-circuit circuit is formed during non-contact charging so that the power does not increase. For this purpose, the control device 26 includes a first detection unit that detects a phase of a current in the rectifier 23, a second detection unit that detects a phase of a voltage in the rectifier 23, a determination unit that determines presence or absence of a deviation between the phase of the current and the phase of the voltage, a decision unit that decides a short-circuit phase, and a control unit that executes power control according to the short-circuit phase.

The first detection unit detects the phase of the current on the input side of the rectifier 23 on the basis of the signal from the current sensor 24. The current sensor 24 functions as a sensor for detecting the phase of the current. The first detection unit detects the phase of the current flowing into the rectifier 23 in real time.

The second detection unit detects the phase of the voltage on the input side of the rectifier 23 on the basis of the signal from the voltage sensor 25. The voltage sensor 25 functions as a sensor for detecting the phase of the voltage. The second detection unit detects the phase of the voltage input to the rectifier 23 in real time.

The determination unit determines whether the phase of the current is deviated from the phase of the voltage on the basis of the phase of the current detected by the first detection unit and the phase of the voltage detected by the second detection unit.

Depending on the phase deviation determined by the determination unit, the decision unit decides, as the phase (short-circuit phase) of the short-circuit mode, a phase in which the power factor deteriorating effect is obtained as a result of executing the short-circuit mode on the phase deviation. The short-circuit phase is decided so that, with the phase shift caused by the execution of the short-circuit mode, the power factor deteriorating effect can be obtained.

The control unit performs the power control on the basis of the short-circuit phase decided by the decision unit and the duty of the short-circuit mode.

Figure 12:
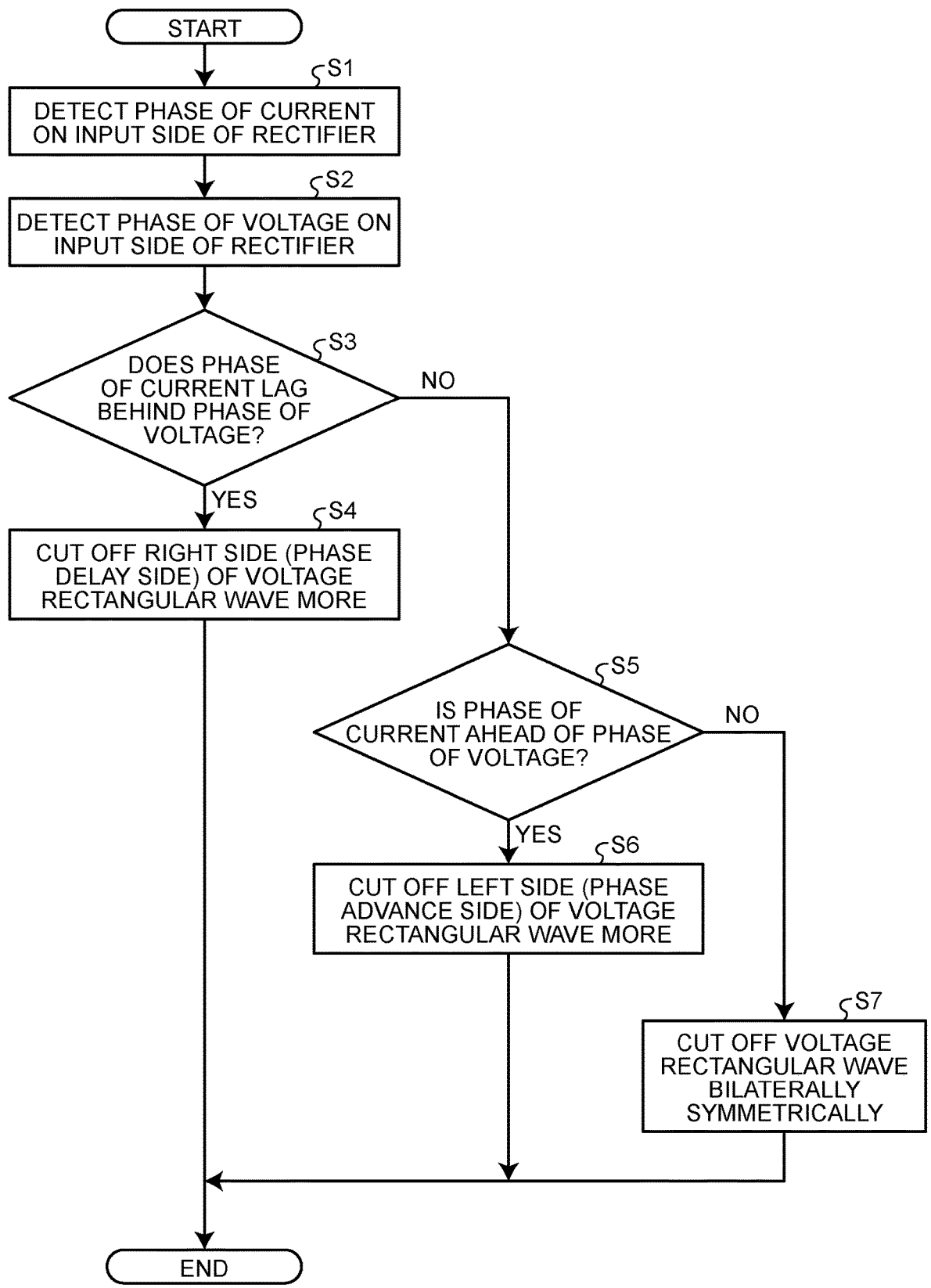
FIG. 12 is a flowchart illustrating a power control flow.

FIG. 12 is a flowchart illustrating a power control flow. Control illustrated in FIG. 12 is performed by the control device 26.

The control device 26 detects the phase of the current on the input side of the rectifier 23 (step S1). In step S1, the first detection unit detects the phase of the current flowing into the rectifier 23 in real time on the basis of the signal input from the current sensor 24 to the control device 26.

The control device 26 detects the phase of the voltage on the input side of the rectifier 23 (step S2). In step S2, the second detection unit detects the phase of the voltage input to the rectifier 23 in real time on the basis of the signal input from the voltage sensor 25 to the control device 26.

The control device 26 determines whether the phase of the current lags behind the phase of the voltage in the rectifier 23 on the basis of the phase of the current detected by the first detection unit and the phase of the voltage detected by the second detection unit (step S3). In step S3, the determination unit determines whether the phase of the current lags behind the phase of the voltage.

When the rectifier 23 determines that the phase of the current lags behind the phase of the voltage (step S3: Yes), the control device 26 decides (sets) the short-circuit phase so as to largely cut off the right side (phase delay side) of the voltage rectangular wave (step S4). In step S4, the decision unit decides, as the short-circuit phase, the switching timing at which the right side (phase delay side) of the voltage rectangular wave is largely cut off within a range in which the power factor deteriorating effect due to the phase shift can be obtained. The control unit of the control device 26 executes the short-circuit mode on the basis of the short-circuit phase decided in the processing of step S4.

Figure 13:
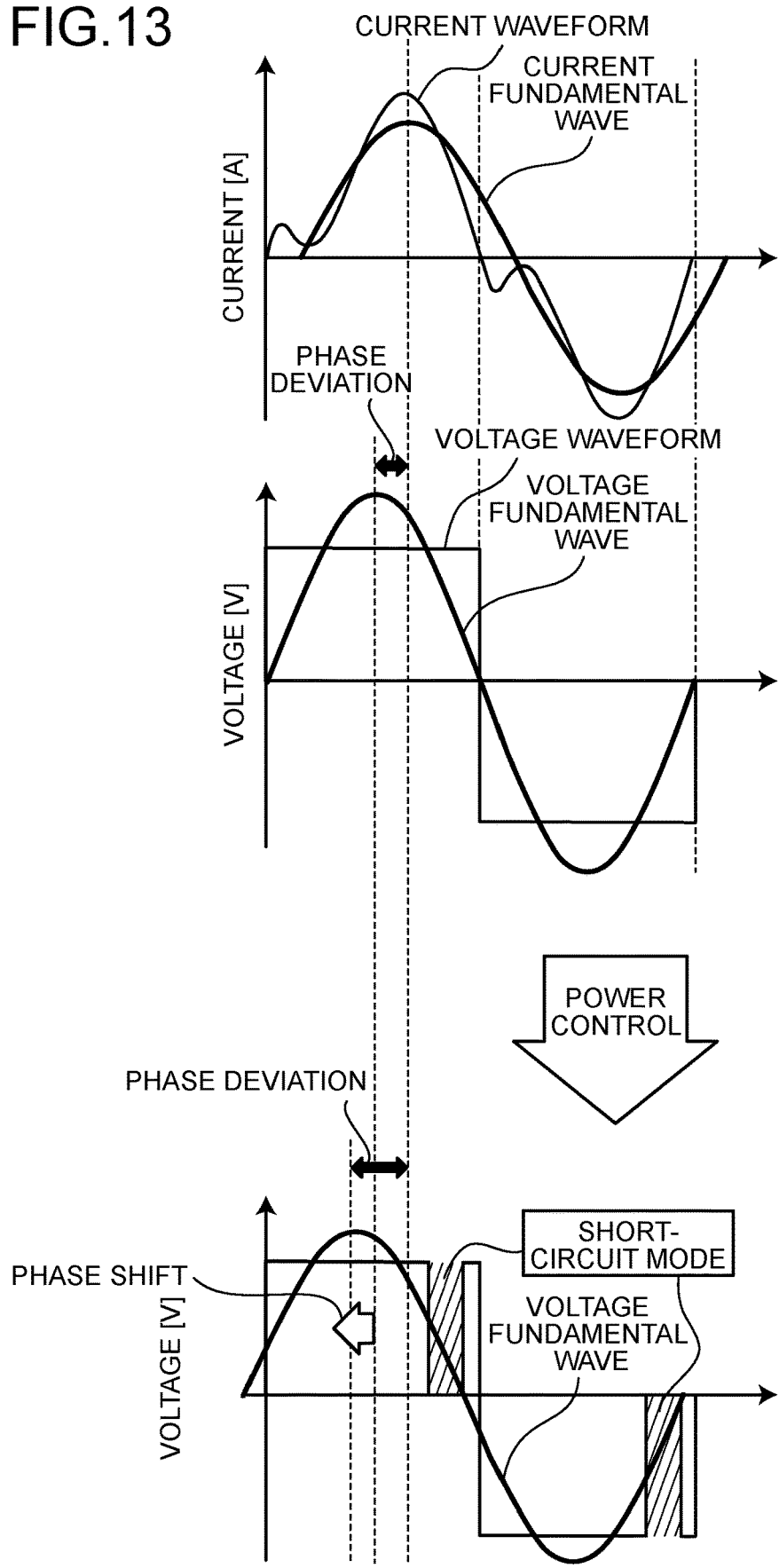
FIG. 13 is a view illustrating a case where the short-circuit mode is executed in the short-circuit phase in which the right side of the voltage rectangular wave is largely cut off when the phase of the current lags behind the phase of the voltage.

As illustrated in FIG. 13, the control device 26 executes power control for largely cutting off the right side of the voltage rectangular wave. As a result, the voltage fundamental wave causes a phase shift in a direction in which the phase deviation from the current basis increases. That is, the voltage fundamental wave shifts in a direction in which the power factor of the received power deteriorates.

When it is determined that the phase of the current in the rectifier 23 does not lag behind the phase of the voltage (step S3: No), the control device 26 determines whether the phase of the current in the rectifier 23 is ahead of the phase of the voltage (step S5). In step S5, the determination unit determines whether the phase of the current is ahead of the phase of the voltage.

If it is determined that the phase of the current in the rectifier 23 is ahead of the phase of the voltage (step S5: Yes), the control device 26 decides the short-circuit phase so as to largely cut off the left side (phase advance side) of the voltage rectangular wave (step S6). In step S6, the decision unit decides, as the short-circuit phase, the switching timing at which the left side (phase advance side) of the voltage rectangular wave is largely cut off within a range in which the power factor deteriorating effect due to the phase shift can be obtained. Then, the control unit of the control device 26 executes the short-circuit mode on the basis of the short-circuit phase decided in the processing of step S6.

Figure 14:
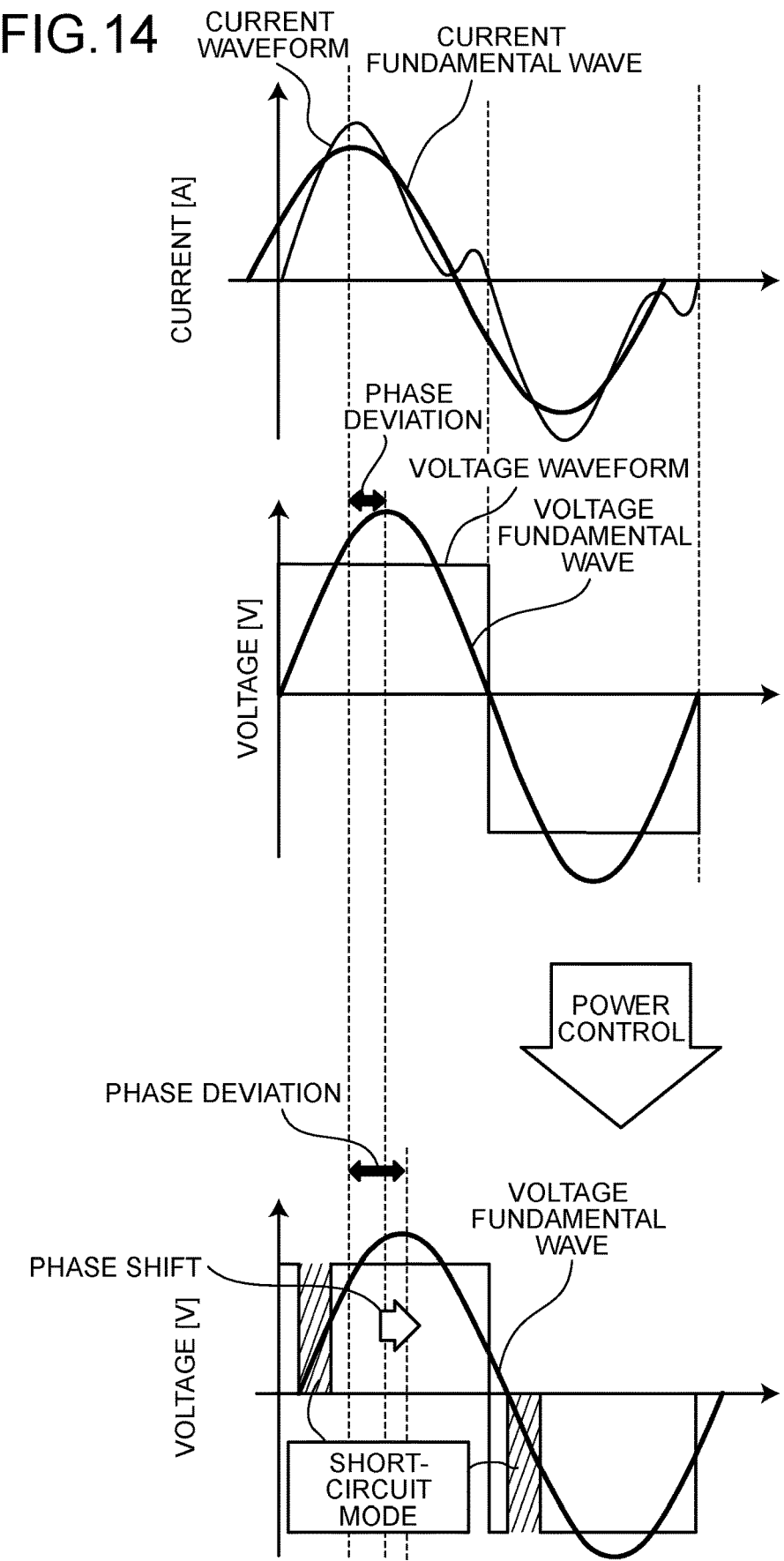
FIG. 14 is a view illustrating a case where the short-circuit mode is executed in the short-circuit phase in which the left side of the voltage rectangular wave is largely cut off when the phase of the current is ahead of the phase of the voltage.

As illustrated in FIG. 14, the control device 26 executes power control for largely cutting off the left side of the voltage rectangular wave. As a result, the voltage fundamental wave causes a phase shift in the direction in which the phase deviation from the current basis increases. That is, the voltage fundamental wave shifts in the direction in which the power factor of the received power deteriorates.

When it is decided that the phase of the current in the rectifier 23 is not ahead of the phase of the voltage (step S5: No), the control device 26 determines that the phase of the current and the phase of the voltage are in the same phase, and decides the short-circuit phase so as to cut off the voltage rectangular wave bilaterally symmetrically (step S7). In step S7, the decision unit decides the switching timing at which the left and right sides of the voltage rectangular wave are symmetrically cut off as the short-circuit phase so that the power factor improving effect due to the phase shift does not occur. Then, the control unit of the control device 26 executes the short-circuit mode on the basis of the short-circuit phase decided in the processing of step S7.

Figure 15:
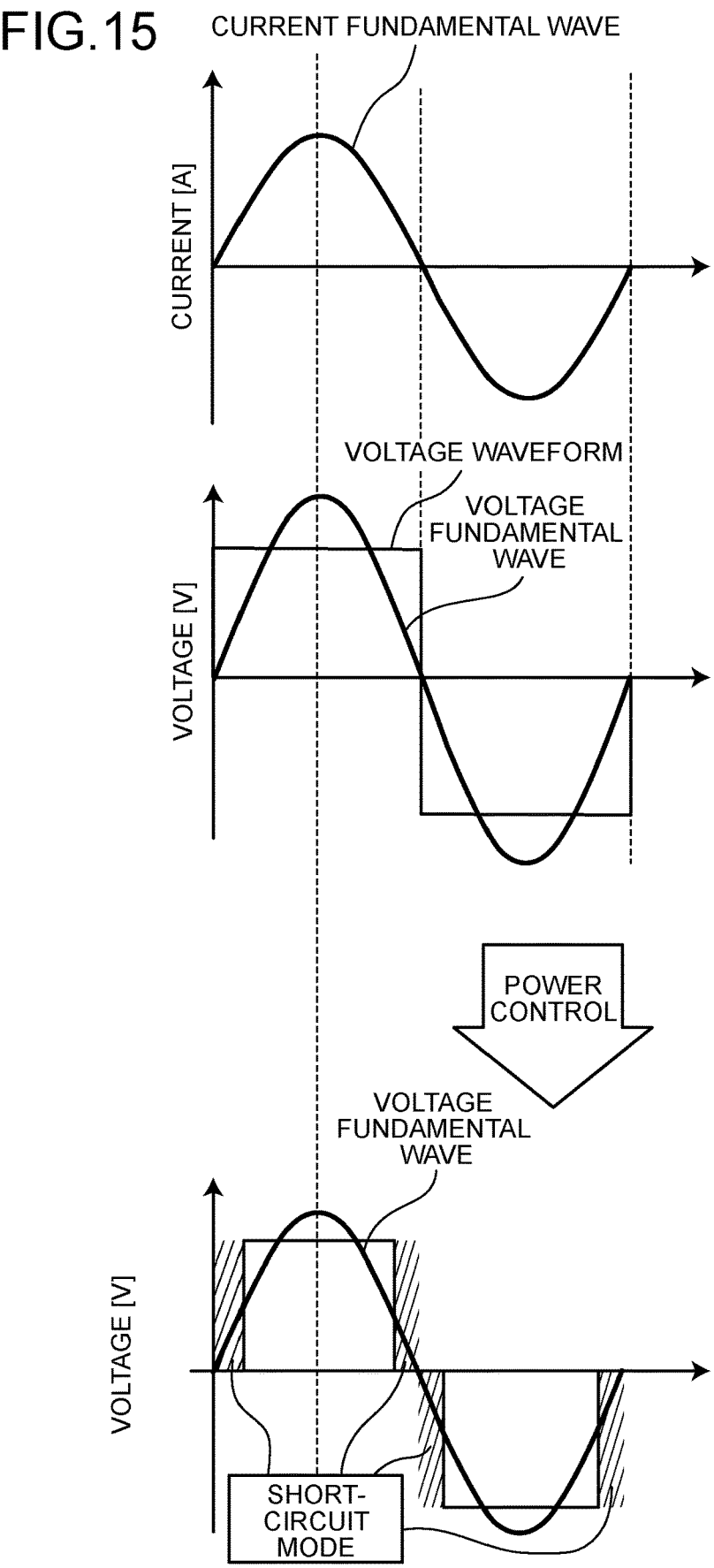
FIG. 15 is a view illustrating a case where the short-circuit mode is executed in the short-circuit phase in which the voltage rectangular wave is cut off bilaterally symmetrically in a case where the phase of the current and the phase of the voltage are the same phase.

As illustrated in FIG. 15, the control device 26 executes power control for cutting the left and right sides of the voltage rectangular wave so as to be symmetric. As a result, the voltage fundamental wave does not shift in phase and does not produce the power factor improving effect.

As described above, according to the embodiment, it is possible to suppress an unintentional increase in power when the power control is executed using the switching element provided in the power reception device 20. Thus, it is possible to protect the load on the power reception side when performing non-contact charging.

Note that the current sensor 24 may detect the phase of the current and output a detection signal thereof to the control device 26. The control device 26 acquires information regarding the phase of the current included in the signal from the current sensor 24.

Further, installation places of the current sensor 24 and the voltage sensor 25 are not particularly limited. For example, the control device 26 can estimate the current flowing through the rectifier 23 and the voltage applied to the rectifier 23. That is, it is sufficient if the control device 26 can acquire current value information with which the current flowing through the rectifier 23 can be estimated, and the connection location of the current sensor 24 is not particularly limited. Similarly, it is sufficient if the control device 26 can acquire voltage information with which the voltage applied to the rectifier 23 can be estimated, and the connection location of the voltage sensor 25 is not particularly limited.

In addition, in the rectifier 23, the switching elements may not be connected in parallel to all the diodes. For example, in the rectifier 23, when the switching elements are connected in parallel to the diode D21 and the diode D23, the switching elements may not be connected in parallel to the diode D22 and the diode D24. Similarly, in the rectifier 23, when the switching elements are connected in parallel to the diode D22 and the diode D24, the switching elements may not be connected in parallel to the diode D21 and the diode D23.

Further, in the non-contact power transmission system 1 in which the power transmission device 10 is installed on the ground and the power reception device 20 is mounted on the vehicle 100, it is possible to perform non-contact charging not only in a case where the vehicle 100 performs non-contact charging while traveling but also in a state where the vehicle 100 is stopped. That is, the mechanism in which the formation of the short circuit by the rectifier 23 causes an increase in the received power is not limited to the power feeding during traveling but also corresponds to the power feeding during stopping. Thus, the control device 26 can execute the short-circuit mode by controlling the switching element of the rectifier 23 when receiving power from the power transmission device 10 on the ground side in a non-contact manner while the vehicle 100 is stopped. At that time, the control device 26 can decide the switching timing in the short-circuit mode so as to generate the phase shift in the direction of deteriorating the power factor of the received power.

Further, with respect to the switching timing of the switching element in the short-circuit mode, the control device 26 is not limited to a case where only the left side of the voltage rectangular wave is cut off or a case where only the right side of the voltage rectangular wave is cut off. In short, the control device 26 can set the short-circuit phase so that the left side of the voltage rectangular wave is cut off more than the right side, and can set the short-circuit phase so that the right side of the voltage rectangular wave is cut off more than the left side. When the phase of the current lags behind the phase of the voltage, the control device 26 can decide the switching timing of the switching element of the rectifier 23 so that the right side of the voltage rectangular wave is cut off more than the left side. When the phase of the current is ahead of the phase of the voltage, the control device 26 can decide the switching timing of the switching element of the rectifier 23 so that the left side of the voltage rectangular wave is cut off more than the right side.

In the present disclosure, since the power factor of power can be deteriorated by executing the short-circuit mode, an increase in power due to the switching operation can be suppressed.

According to an embodiment, since the power factor of power can be deteriorated by executing the short-circuit mode, an increase in power due to the switching operation can be suppressed.

According to an embodiment, when the phase of the current lags behind the phase of the voltage, the phase of the short-circuit mode can be decided so as to largely cut off the right side of the voltage rectangular wave, so that the power factor is deteriorated by a phase shift, and thus the increase in power due to the switching operation can be suppressed.

According to an embodiment, when the phase of the current is ahead of the phase of the voltage, the phase of the short-circuit mode can be decided so as to largely cut off the left side of the voltage rectangular wave, so that the power factor is deteriorated by the phase shift, and thus the increase in power due to the switching operation can be suppressed.

According to an embodiment, in the non-contact power transmission system including the power transmission device and the power reception device, the power factor of the power can be deteriorated by executing the short-circuit mode on the power reception device side, so that the increase in power due to the switching operation can be suppressed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power reception device, comprising:
    a power reception coil that receives power transmitted from a power transmission coil in a non-contact manner; and
    a control device that executes a short-circuit mode in which a plurality of switching elements provided between the power reception coil and a load are caused to perform switching operations to short-circuit between output terminals of the power reception coil, wherein
    when a phase of a current and a phase of a voltage in the power reception device are deviated from each other, the control device sets switching timings of the switching elements to the short-circuit mode in a manner that the phase of the voltage is shifted in a direction in which a power factor of power supplied to the load is deteriorated.

2. The power reception device according to claim 1, wherein
    the control device
    sets, when the phase of the current lags behind the phase of the voltage, the switching timings of the switching elements to the short-circuit mode in a manner that a right side of a voltage rectangular wave is more cut off than a left side of the voltage rectangular wave, and
    sets, when the phase of the current is ahead of the phase of the voltage, the switching timings of the switching elements to the short-circuit mode in a manner that the left side of a voltage rectangular wave is more cut off than the right side of the voltage rectangular wave.

3. The power reception device according to claim 2, wherein
    when the phase of the current and the phase of the voltage are not deviated from each other, the control device sets the switching timings of the switching elements to the short-circuit mode in a manner that the voltage rectangular wave is cut off bilaterally symmetrically.

4. A non-contact power transmission system comprising:
    the power reception device according to claim 1; and
    a power transmission device including the power transmission coil.

* * * * *